United States Patent [19]

Zook et al.

[11] Patent Number: 4,996,944
[45] Date of Patent: Mar. 5, 1991

[54] KENNEL ACCESSORY

[76] Inventors: Linda D. Zook, 1578 Old Williamsburg Rd., Yorktown, Va. 23690; Shirley S. White, P.O. Box 1037, Grafton, Va. 23692

[21] Appl. No.: 484,821

[22] Filed: Feb. 26, 1990

[51] Int. Cl.⁵ .............................................. A01K 1/035
[52] U.S. Cl. ...................................... 119/20; 119/28.5
[58] Field of Search ......................... 119/20, 19, 1, 158

[56] References Cited

U.S. PATENT DOCUMENTS

| | | | |
|---|---|---|---|
| 1,330,405 | 2/1920 | Sommer | 119/20 |
| 2,438,979 | 4/1948 | Short | 119/158 X |
| 2,722,910 | 11/1955 | Sundstrom | 119/19 |
| 3,129,693 | 4/1964 | De Vore et al. | 119/20 |
| 3,338,213 | 8/1967 | Reynolds et al. | 119/20 X |
| 3,941,093 | 3/1976 | Sievers et al. | 119/20 |
| 4,348,986 | 9/1982 | Marrs | 119/20 |
| 4,359,967 | 11/1982 | Cornelson | 119/20 X |
| 4,539,935 | 9/1985 | Meyer | 119/1 |
| 4,852,520 | 8/1989 | Goetz | 119/19 |

FOREIGN PATENT DOCUMENTS

| | | | |
|---|---|---|---|
| 1137893 | 3/1962 | Fed. Rep. of Germany | 119/20 |
| 1333330 | 6/1963 | France | 119/20 |
| 0741106 | 11/1955 | United Kingdom | 119/20 |

Primary Examiner—Robert P. Swiatek
Assistant Examiner—Todd E. Manahan
Attorney, Agent, or Firm—Wallace J. Nelson

[57] ABSTRACT

A kennel accessory formed of PVC tubing and having a peripheral rail portion for releasable attachment to the inside surface of a portable dog kennel base portion and having legs thereon maintaining the rail elevated from the kennel floor. The rail provides an adequate escape area for newborn pups to prevent the mother dog from laying down on and crushing, or smothering, the pups. The legs of the accessory also permit releasable fixing of a rug type kennel bedding to the kennel floor to prevent the mother dog from digging up the bedding with the subsequent danger of smothering the pups by the bedding.

6 Claims, 1 Drawing Sheet

KENNEL ACCESSORY

FIELD OF THE INVENTION

This invention relates to kennel accessories in general and relates specifically to a removable peripheral rail attached to the inside surface of a portable kennel base to provide a protective area for newborn pups against accidental smother or crushing by the mother dog.

BACKGROUND OF THE INVENTION

Breeders of expensive show dogs, and in particularly, small or miniature dogs frequently lose one or more newborn pups in a litter due to the mother dog accidently crushing the pup(s) with her body or by smothering the pup with her body or by the bedding material in the kennel. In breeding large dogs, large litters are usually obtained and the loss of one or two pups from a large litter, although not desired, is not critical. Small or miniature dogs, such as the tea cup size Maltese, Chihuahua, and the like, are expensive and usually have litters consisting of only one or two pups. The standard stud fee usually involves giving the stud owner his "pick of the litter" or an equivalent cash sum. Since owners of small breed females may expect only one or two pups, they usually prefer to pay a cash fee rather than risk giving up all or fifty percent of the litter. If one or two pups are smothered or crushed by the mother dog, the breeder may lose his entire investment.

Accordingly, it is an object of the present invention to provide apparatus that will help prevent, or reduce the likelihood of, accidental smothering or crushing of newborn pups by the mother dog.

Another object of the present invention is to provide a kennel accessory that is releasably attached within the base portion of a portable kennel and serves to provide a protective device for newborn pups born or placed within the kennel base.

A further object of the present invention is a kennel accessory releasably secured to the inside periphery of a portable kennel base portion and spaced from the bottom thereof to provide a peripheral area of protection for newborn pups within the kennel base.

An additional object of the present invention is a kennel accessory positioned within a kennel base portion and serving to secure bedding material therein from movement to thereby prevent the mother dog from digging and rearranging the bedding such that it could be a hazard to her newborn pups.

Another object of the present invention is a kennel accessory that reduces the likelihood of a mother dog from trapping and crushing or smothering a pup between her body and the kennel sidewall when she lays down.

SUMMARY OF THE INVENTION

According to the present invention the foregoing and additional objects are attained by providing a base portion of a portable kennel housing, adding a rug type absorbent material to cover the floor therein and inserting a kennel accessory in the form of a removable peripheral ring within the kennel base in spaced relationship to the rug covering. The kennel accessory is provided with a plurality of legs resting on the rug covering to maintain the peripheral ring spaced from the floor and to also prevent movement or disruption of the rug covering by any digging the kennel occupants might undertake. Normally, one leg adjacent to each of the four corners of the square or rectangular kennel accessory would be employed.

To further secure the peripheral ring accessory against movement within the kennel base portion, a plurality of self-penetrating or self-tapping screws are positioned through suitable openings in the peripheral ring accessory and forcibly tapped through the peripheral wall of the kennel base portion. Each screw is provided with a suitable nut threadingly secured on the exposed sharp end extending through the kennel wall to prevent accidental injury and to assist in maintaining the accessory in position. The screw heads are provided with rounded surfaces to prevent any danger to the mother dog and her pups. The kennel accessory normally abuts the kennel housing wall on at least three sides and has sufficient thickness to provide spacing thereunder adequate to serve as an escape area for the pups when the mother dog lays down.

BRIEF DESCRIPTION OF THE DRAWINGS

A more complete appreciation of the invention and many of the attendant advantages thereof will be more readily apparent as the same becomes better understood with reference to the following detailed description when considered in connection with the accompanying drawings wherein.

DETAILED DESCRIPTION OF THE PREFERRED EMBODIMENT

Figure 1:
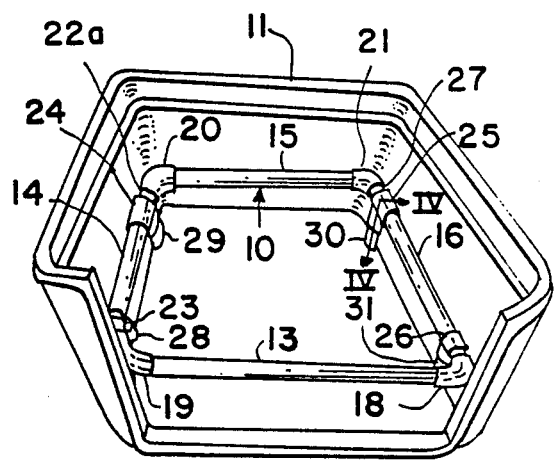
FIG. 1 is a front perspective view of the kennel accessory of the present invention installed within a portable kennel base.
Figure 2:
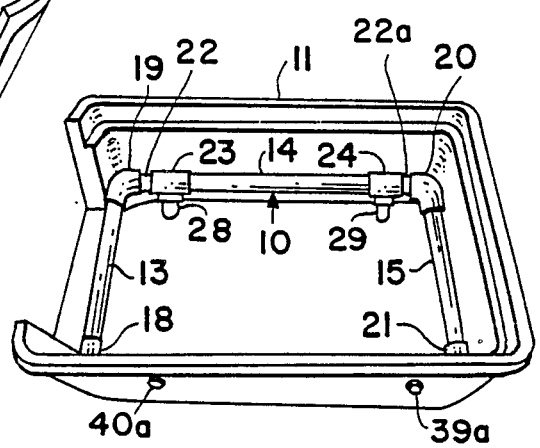
FIG. 2 is a side perspective view of the kennel accessory shown in FIG. 1.

Referring now to the drawing, and more particularly to FIGS. 1 and 2, the kennel accessory of the present invention is shown and designated generally by reference numeral 10. Kennel accessory 10, as illustrated, is positioned within and releasably attached to a portable kennel base portion 11. Kennel accessory 10 is in the form of a rail having a substantially rectangular configuration and is adapted to abut against three of the inside wall surfaces of kennel base portion 11. The other side of kennel accessory 10 is maintained slightly spaced from the front open end of kennel base portion 11, as will be further explained hereinafter.

Accessory 10, in the illustrated embodiment, is constructed of tubular conduit and includes four straight sections of tubing 13, 14, 15 and 16; four elbow sections 18, 19, 20 and 21; and, four T-joints 23, 24, 25 and 26. T-joints 23, 24 receive the ends of straight tubular section 14 and are coupled to respective elbow sections 19 and 20 via tubular couplings 22, 22a. T-joints 25, 26 receive the ends of straight tubular section 16 and are coupled to elbow sections 18, 21 via couplings 27, 27a. A short straight tubular section is positioned within the depending open end of each T-section. These four tubular sections, designated by reference numerals 28, 29, 30 and 31, serve as legs to maintain the rail portion of kennel accessory 10 spaced from the inside bottom surface of kennel base portion 11.

A moisture absorbent rug 35, having a rubber base and a nap surface, is positioned over the inside bottom surface of kennel base portion 11 and serves as the bedding for the mother dog and her pup(s). Commercially available bedding rugs of this type are available under the tradename "Sani-Lon." Bedding rug 35 is anchored flush against the inside of base portion 11 by the pressure exerted thereon by legs 28, 29, 30 and 31 of accessory 10. This releasably fixed rug bedding prevents the mother dog from "digging up", or clumping, of the bedding to further endanger smothering of the pup(s). Transverse screws 37, 38, 39 and 40 (FIG. 3) serve to insure that legs 28, 29, 30 and 31 are maintained in tight contact with rug 35, and to otherwise prevent movement of kennel accessory 10 by the mother dog. Transverse screws 37, 38, 39 and 40 are self-tapping screws and are positioned at spaced intervals, through predrilled openings in peripheral ring accessory 10, and tapped through the sidewalls of kennel base portion 11.

Figure 3:
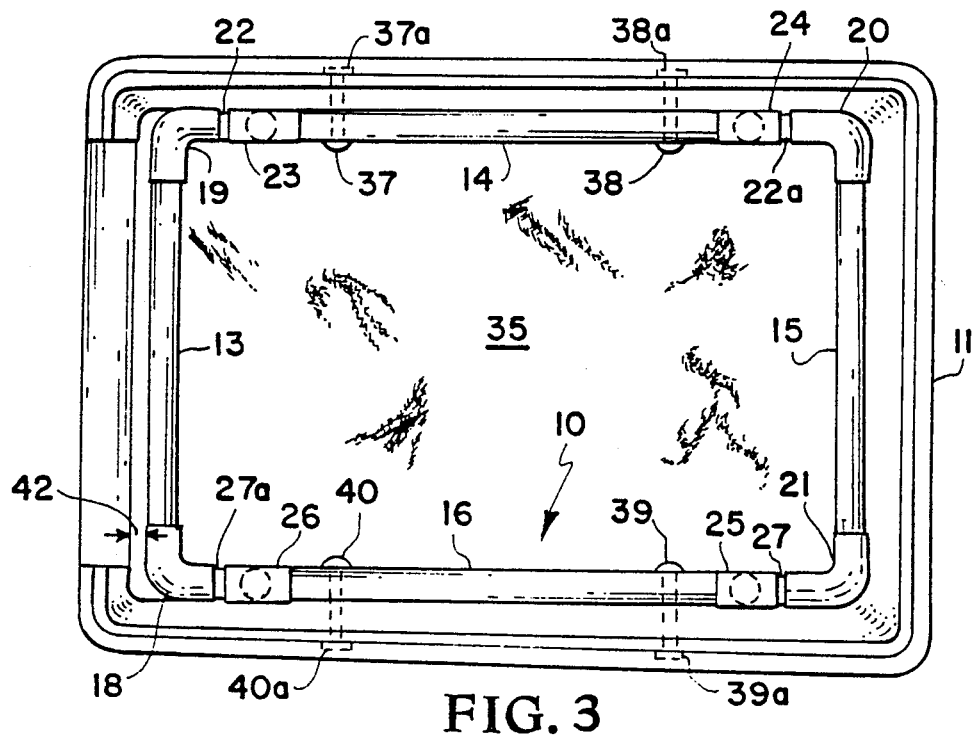
FIG. 3 is a top plan view of the kennel accessory and portable kennel base portion shown in FIG. 1.

As illustrated in FIG. 3, screws 37, 38 extend through the sidewall of kennel base portion 11 and straight section 14, adjacent respective T-sections 23, 24 of accessory 10, while screws 39, 40 extend through the opposite sidewall of base portion 11 and transversely through straight section 16. Suitable threaded nuts, designated by reference numerals 37a, 38a, 39a and 40a are provided on the sharp pointed ends of screws 37, 38, 39 and 40 and in abutting contact with the exterior surface of kennel base portion 11. Nuts 37a, 38a, 39a and 40a serve to cover or cap, the pointed ends of the tapping screws, for safety, and also assist in securing kennel accessory 10 in releasably fixed position. Each of screws 37, 38, 39 and 40 is provided with a rounded smooth head, not designated, abutting the surface of kennel accessory 10 to prevent any accidental injury to the mother dog or her pup(s)

As discussed hereinbefore, kennel accessory 10 is maintained against the inside surface of three sidewalls of kennel base portion 11 and slightly spaced from the open front end thereof, as designated by reference numeral 42 (FIG. 3). Spacing 42 permits the insertion and frictional retention of a thin sheet of plastics, cardboard, or similar material (not shown), between kennel accessory 10 and the end sections of kennel base portion 11 forming the open end thereof. This material sheet serves to close area 42, when necessary, to prevent the pup(s) from exiting the kennel base portion bed.

The rail portion of kennel accessory 10 makes it very difficult for the mother dog to lay down with her body against the sidewall of the kennel base portion to thereby leave a peripheral escape area for the pup(s). This peripheral escape area inside kennel base portion 11 permits the pup(s) to crawl out from beneath the mother dog in the event the mother dog lays down on the pup(s). This escape area also prevents or effectively reduces the possibility of the mother dog from trapping the pup(s) between her body and the kennel sidewall which frequently results in crushing or smothering the pup(s).

Figure 4:
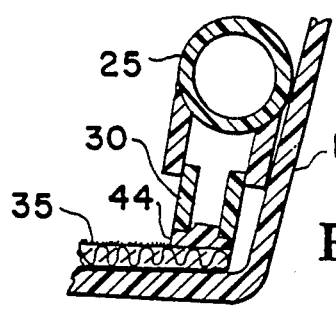
FIG. 4 is a sectional view of the accessory and kennel base portion taken along line IV—IV of FIG. 1.

Although the invention is not limited to specific materials and dimensions, the illustrated preferred embodiment described herein was constructed of three-quarter inch polyvinylchloride (PVC) tubing with the joints between each component being a sliding fit, that optionally, may be adhesively connected. T-joints 23,24,25 and 26 had a top length of two and five-eights inches and a depending open end of two inches. Each open end of the T-joints received approximately one half inch of a two and one-eight inch straight tubular section forming legs 28,29,30 and 31. Suitable plastic (PVC) cap inserts were attached to the end of each leg adapted to rest against bedding rug 35. One cap insert is illustrated in FIG. 4 for leg 30 and designed by reference numeral 44. Caps 44 may be as shown or of any other suitable construction that covers or plugs the open ends of the legs.

Straight pieces of PVC tubing having a length of thirteen and one-half inches and two lengths of twelve and one-quarter inches form the major length of respective side and end portions of kennel accessory 10. Each end of the side lengths 14,16, receives approximately three-eights inch of one of the couplings 22,22a, and 27,27a. These couplings, in the described preferred embodiment, each have a length of one and one eighth inch. The other end of each coupling is positioned approximately three-eighths inch into one of the elbow sections, leaving approximately three-eighths inch of each coupling exposed between the side lengths and each of the elbows. Screws 37,38,39 and 40 are conventional, round head, one-quarter inch self-tapping screws having a length of one and one-half inch with conventional protective plastic end nuts provided therefor.

This specific kennel accessory 10 is designed for a kennel base portion hving a width of twenty six inches, a width of eighteen and one-half inches and a height of sixteen inches. The top for this kennel base portion, not shown, had a length of twenty six and three-eighths inches and a width of eighteen and five-eighths inches. The top is bolted to the base in a conventional manner and designed for easy removal therefrom to permit the base portion to serve as a bed for the dog.

Accessory 10, as described, weighs only two pounds and is easily attached and removed from the kennel base portion for stowage when not in use, as well as for changing of rug 35, as needed. The accessory is also easily disinfected prior to and after use by wiping with regular household bleach, or any other suitable disinfectant. When using only the sliding fit for the individual component parts, accessory 10 may be completely disassembled when removed with the parts thereof stowed in a plastic bag, or the like. Alternately, the joints between each of the component parts may be adhesively sealed, as is conventional in fabricating water and electrical conduits from PVC tubing, to make accessory 10 into a permanent and stowable unitary structure.

There are obviously many other modifications and variations in the present invention that will be readily apparent to those skilled in the art in the light of the above teachings. Although the presently discribed invention is pimarily directed toward boy breeds, it is equally applicable to miniature and medium size breeds. For larger dogs, the kennel accessory 10 would be constructed of larger diameter tubing for use in a larger kennel base portion. Aluminum, stainless steel or other conventional tubing materials may be employed in lieu of the PVC described without departing from the spirit and scop of the invention. Also, in lieu of the regular self-tapping screws described, suitable threaded bolts could be employed to releasably attach kennel accessory 10 to kennel base portion 11, with suitable nuts provided for the bolt ends. The number of self-tapping screws or bolts may be more or less than the four described for the preferred embodiment and the location thereof through kennel accessory 10 may be through the straight sections, T-sections or the elbows, as so desired.

Thus, although the invention has been described relative to a specific embodiment thereof, it is not so limited. It is therefore to be understood that, within the scope of the appended claims, the invention may be practiced other than as specifically described herein.

What is claimed as new and desired to be secured by Letter Patent of the United States is:

1. In combination, a portable, substantially rectangular, kennel base serving as a bed for a mother dog and her pups and a kennel accessory for protecting newly born pups from crushing or smothering by the mother dog;
   said kennel base having peripheral sides surrounding a bottom surface area;
   said kennel accessory including a substantially rectangular rail being constructed and arranged to be received inside of said portable kennel base;
   means maintaining said kennel accessory spaced from said bottom surface area of said kennel base when said kennel accessory is positioned therein;
   means for releasably attaching said kennel accessory to said peripheral sides of said kennel base; and
   a moisture absorbent rug covering said bottom surface area of said kennel base and serving as bedding for the mother dog and her pups.

2. The combination of claim 1 wherein said means maintaining said kennel accessory spaced from the bottom said kennel base includes a plurality of depending legs integral with and extending from said substantially rectangular rail.

3. The combination of claim 2 wherein said plurality of depending legs comprise at least one leg disposed adjacent each corner of said substantailly rectangular rail, each said at least one leg being in contact with and preventing movement of said moisture absorbent rug by action of the mother dog and pups.

4. The combination of claim 2 wherein said substantially rectangular rail is formed of straight, elbow and T-sections of substantially rigid tubular polyvinylchloride.

5. The combination of claim 8 wherein the diameter of said tubular polyvinylchloride and the length of said plurality of depending legs are adequate to provide an escape area between said substantially rectangular rail, said peripheral sides, and said bottom surface area of said kennel base portion for newborn puppies and thereby reduce the possibility of the mother dog laying down on and crushing or smothering the puppies between her body and the kennel base walls.

6. The combination of claim 1 wherein said means for releasably attaching said kennel accessory to the peripheral inside surface of said kennel base includes a plurality of transverse opening extending through said rail at selected spaced intervals along said rail and a plurality of self-tapping screws extending, one each, through said plurality of transverse openings and tapped through said peripheral sides of said kennel base, and a protective nut threadingly capping the sharp end of each said screw.

* * * * *